US005470477A

United States Patent [19]

Farnsworth

[11] Patent Number: 5,470,477

[45] Date of Patent: Nov. 28, 1995

[54] PARTS WASHER

[75] Inventor: Albert M. Farnsworth, Chandler, Ariz.

[73] Assignee: Farnsworth Family Trust, Gilbert, Ariz.

[21] Appl. No.: 976,435

[22] Filed: Nov. 13, 1992

[51] Int. Cl.[6] .......... B01D 11/04

[52] U.S. Cl. .......... 210/634; 210/261

[58] Field of Search .......... 210/634, 167, 210/196, 195.1, 519, 522, 261, 262

[56] References Cited

U.S. PATENT DOCUMENTS

| | | | |
|---|---|---|---|
| 3,707,404 | 12/1972 | Carlson et al. | 134/10 |
| 3,971,394 | 7/1976 | Osborne | 210/167 X |
| 5,232,299 | 8/1993 | Hiss | 401/143 |

*Primary Examiner*—Frank Spear

*Attorney, Agent, or Firm*—Cahill, Sutton & Thomas

[57] ABSTRACT

The basin of a parts washer includes a spigot for showering parts to be washed with a solvent and a drain for draining contaminant entrained solvent. The drain conveys the contaminant entrained solvent into a removable tank containing a filtering fluid, such as water, of a higher density than the solvent. The solvent percolates upwardly through the filtering fluid into an upper tank. During percolation, the contaminants are segregated from the solvent and migrate to the bottom of the tank. In a variant parts washer, the solvent floats upon the filtering fluid in a common tank and the contaminants, in the form of a sludge, are segregated from freestanding filtering fluid and are collected as a moist, but not wet, sludge in a removable tank for disposal. When a water based solvent is used with any of the parts washers, only a single fluid is present; nevertheless heavy particulates and insoluble contaminants and debris will settle and migrate into the respective removable tank.

23 Claims, 4 Drawing Sheets

FIG. 5
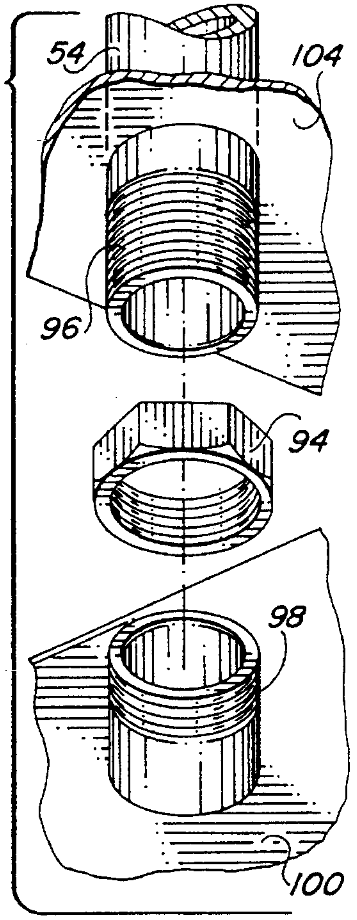
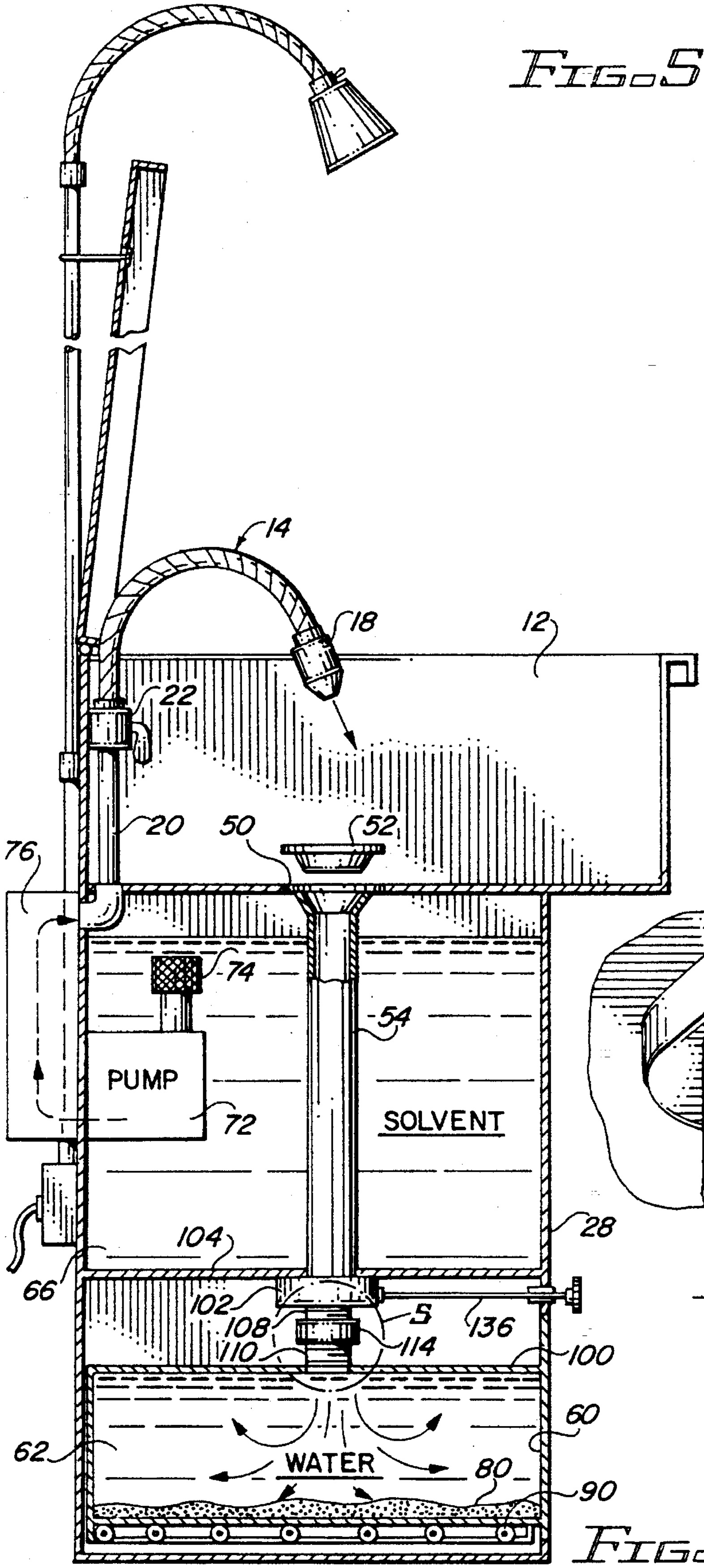
FIG. 2
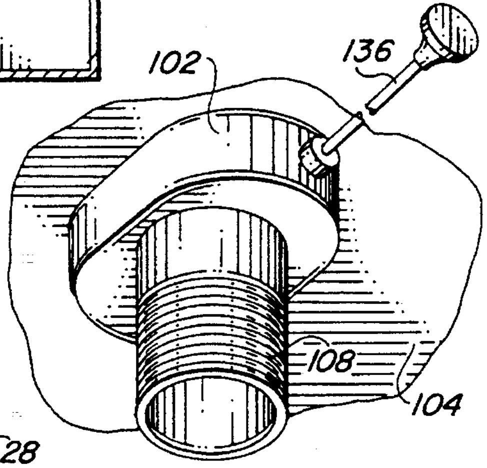
FIG. 6

SOLVENT
PUMP
H2O
H2O
12
142
150
198
206
194
162
164
166
168
170
172
174
176
146
200
204
208
210
144
202
206
196
192
190

SOLVENT
PUMP
H2O
12
142
150
140
152
144
146
148
156
10
168
174
180
160
158
162
164
166
170
172
176
154
178

PARTS WASHER

BACKGROUND OF THE INVENTION

1. Field of the Invention

The present invention relates to parts washers and, more particularly, to a parts washer for collecting either wet or just moist sludge in a removable tank.

2. Description of Related Art

Parts washers have been available for decades for cleaning parts of contaminants, dirt, grease, combinations thereof, etc. One field in which such parts washers are used extensively is that in automotive repair facilities where dirty or contaminated parts are cleaned for disassembly and/or assembly. Parts washers of this type are also used in many other industries.

As set forth in U.S. Pat. No. 3,707,404, a conventional parts washer includes a tank having a cleaning solvent floating upon a more dense fluid, such as water. A basin, located above the tank and wherein the parts are washed, includes a drain extending downwardly into the water. A pump pumps the solvent upwardly for discharge into the basin to accommodate washing/scrubbing of the parts with the solvent. The solvent drains through the drain into the water due to the pressure head of solvent developed in the drain. Solvent and entrained contaminants discharge from the drain into the water and the solvent percolates upwardly while the contaminants are segregated from the solvent and sink to the bottom of the tank. An outlet at the bottom of the tank permits periodic drainage of the sludge and water.

Because the sludge in the tank tends to become packed, it will not readily drain and may collect for a period of years. Where the sludge is toxic and corrosive, the bottom of the tank may deteriorate to the extent of creating a health hazard due to leakage of the sludge. Under present safety regulations, disposal of waste water containing toxic sludge is significantly more expensive than the costs attendant disposal of only moist toxic sludge. To empty the sludge from the tank through a drain requires unnecessary handling and creates potential safety hazards as well as incurring additional costs.

SUMMARY OF THE INVENTION

The basin of a parts washer includes a spigot for directing a stream of solvent upon parts to be washed within the basin. The solvent, and any entrained contaminants, drain from the basin and are expelled into a tank containing a filtering fluid of greater density than the solvent. For most solvents, such a filtering fluid may be water. The solvent percolates upwardly through the filtering fluid, which act of percolation will segregate the entrained contaminants and the solvent will collect above and be supported upon the filtering fluid. A pump, having an inlet in fluid communication with the solvent, provides a stream of solvent under pressure to the spigot. In one embodiment, the filtering fluid is contained within a segregable tank to accommodate removal of the tank and disposal of the contaminants (sludge) and the filtering fluid. In an other embodiment, the contaminants are collected to express the filtering fluid therefrom prior to discharge of the moist, but not wet, contaminants or sludge into a removable tank. This variant is particularly useful for toxic or hazardous sludge as the costs of disposal are significantly less for moist rather than wet sludge. A water based solvent may be used with any of the embodiments of the parts washer and in such event a filtering fluid is not present. The heavy particulates and insoluble contaminants and debris settle out and migrate downwardly to the respective removable tank and form a sludge therein.

It is therefore a primary object of the present invention to provide apparatus for removing sludge collected in a parts washer.

Another object of the present invention is to provide apparatus for removing containers containing sludge from a parts washer.

Yet another object of the present invention is to provide apparatus for collecting moist but not wet sludge from a parts washer.

Still another object of the present invention is to provide apparatus for segregating a sludge from a filtering fluid in a parts washer.

A further object of the present invention is to provide apparatus for safely removing toxic and/or hazardous sludge from a parts washer.

A yet further object of the present invention is to provide apparatus for preparing for disposal sludge collected in a parts washer.

A still further object of the present invention is to provide a method for collecting and removing sludge from a parts washer.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

Figures 1, 3, 4:
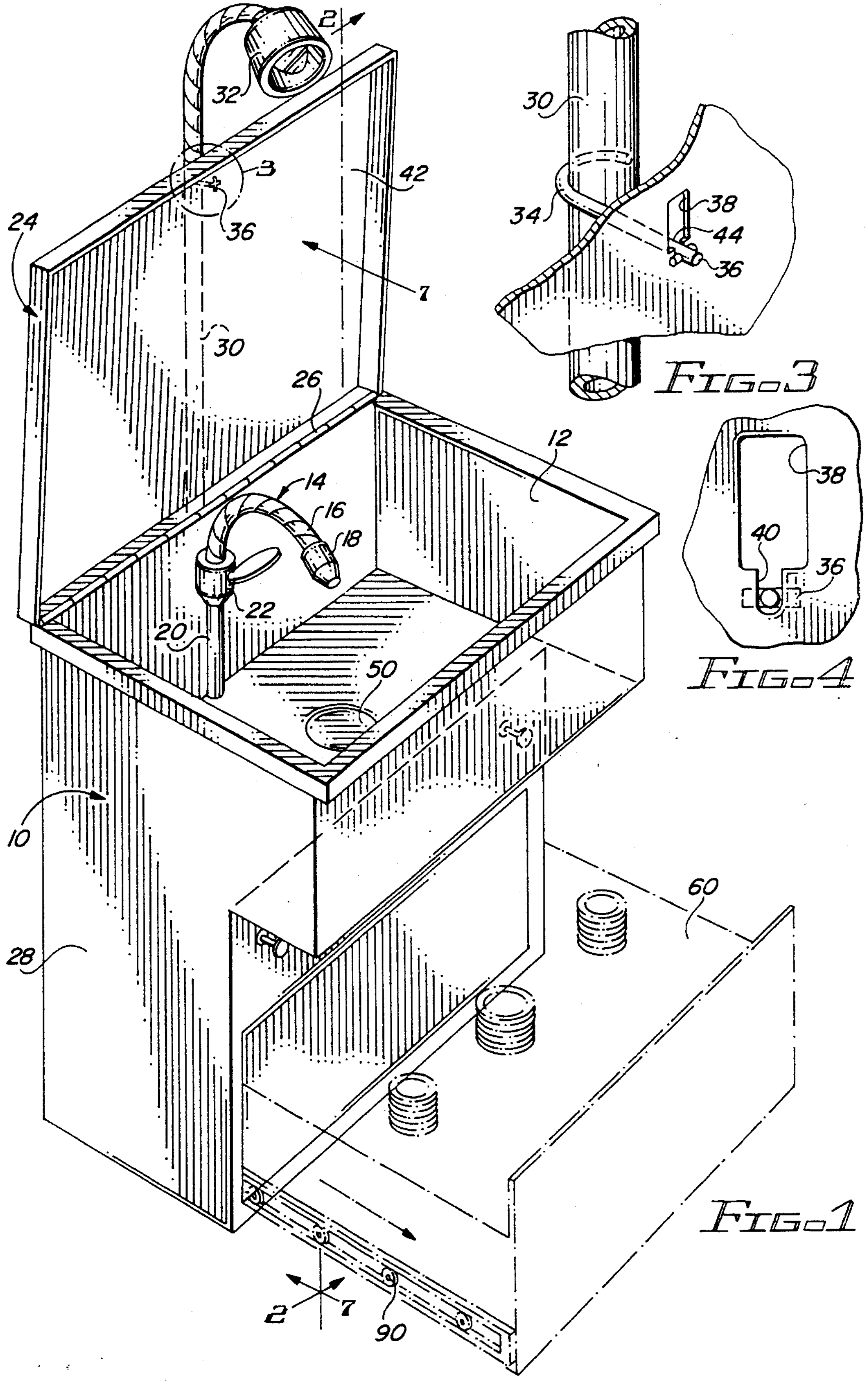
FIG. 1 illustrates a three quarter isometric view of a parts washer.
Figure 7:
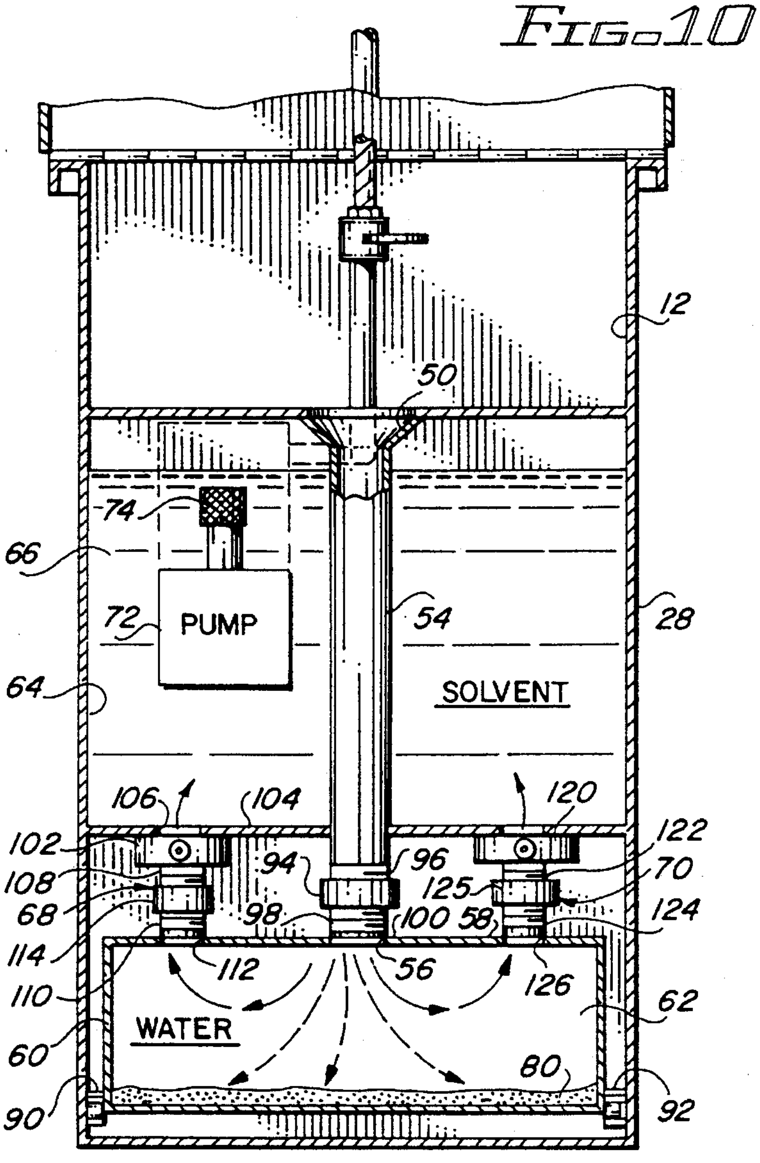
Figure 9:
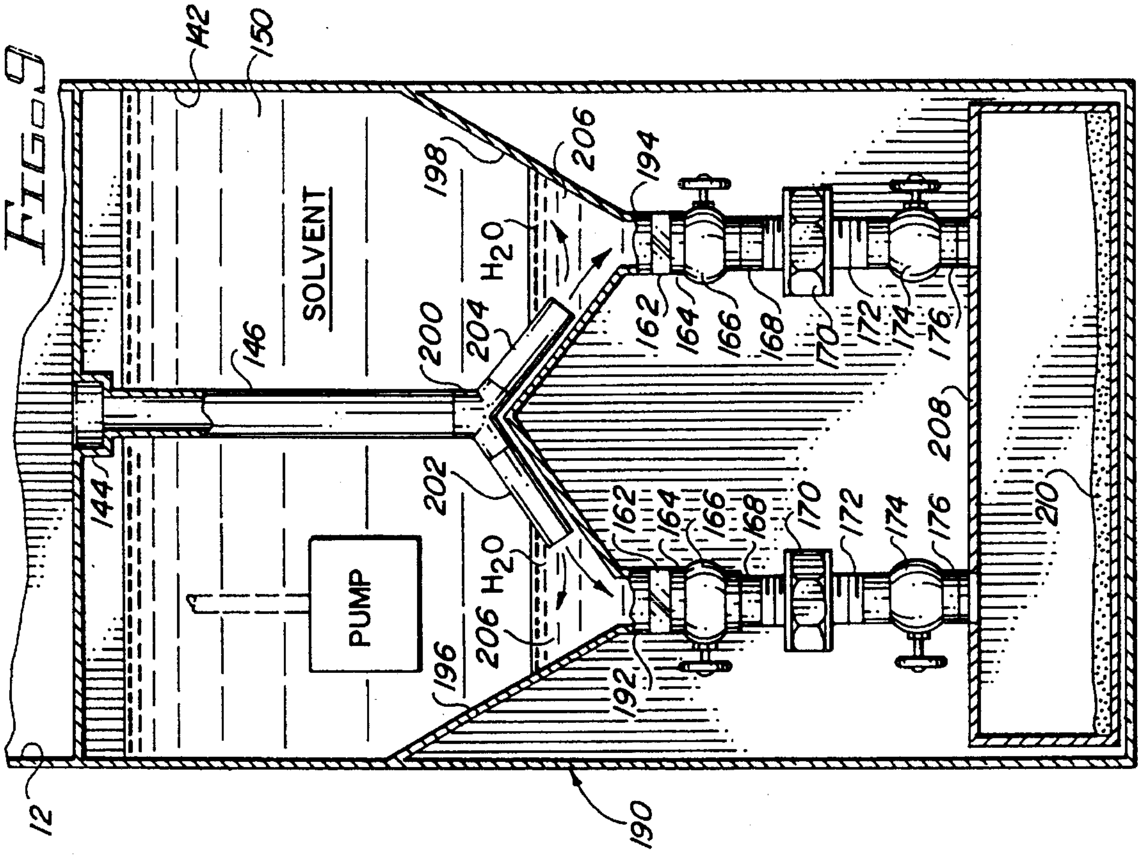
Figure 8:
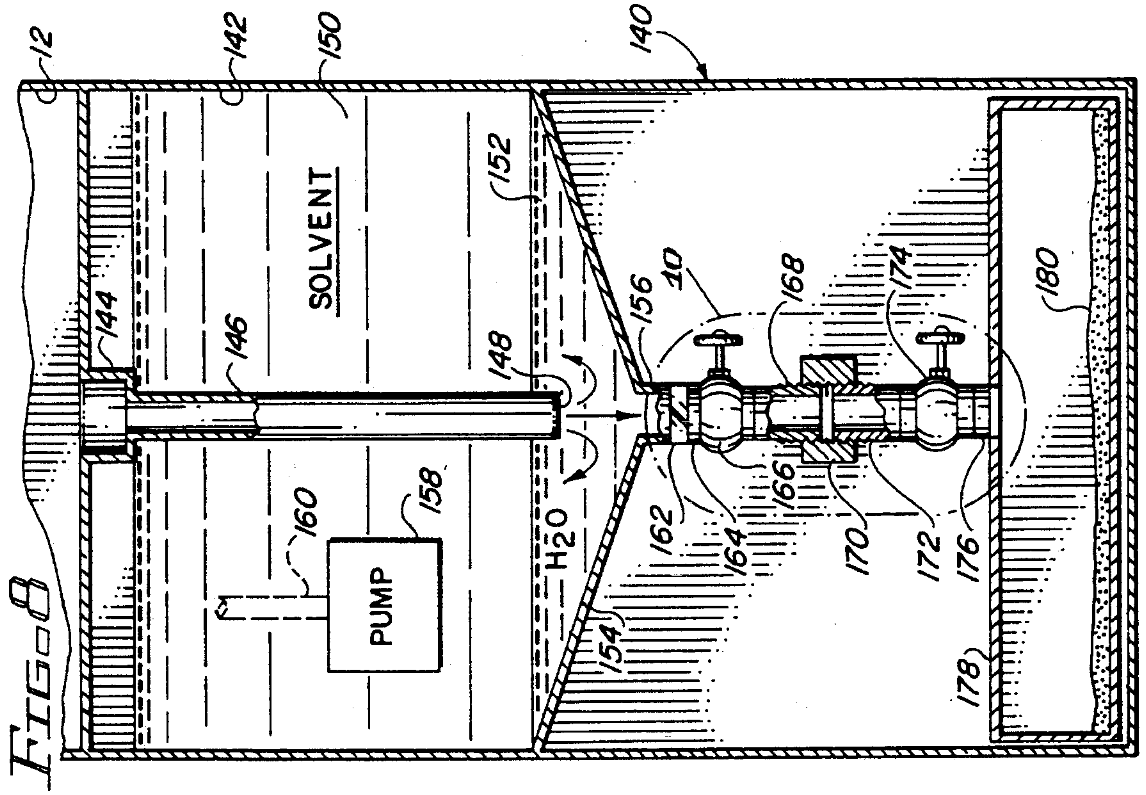

FIG. *2a* illustrates the cover of the parts washer in the closed position;

FIG. 3 is a detail view of structure identified by numeral 3 in FIG. 1;

FIG. 4 is a partial view of apparatus for securing the cover of the parts washer in an upright position;

FIG. 5 is an exploded view of structure identified by numeral 5 in FIG. 2;

FIG. 6 is a detail view of a valve for controlling flow;

FIG. 7 is a cross-sectional view taken along lines 7—7, as shown in FIG. 1;

FIG. 8 illustrates a first variant of the parts washer;

FIG. 9 illustrates a second variant of the parts washer; and

Figure 10:
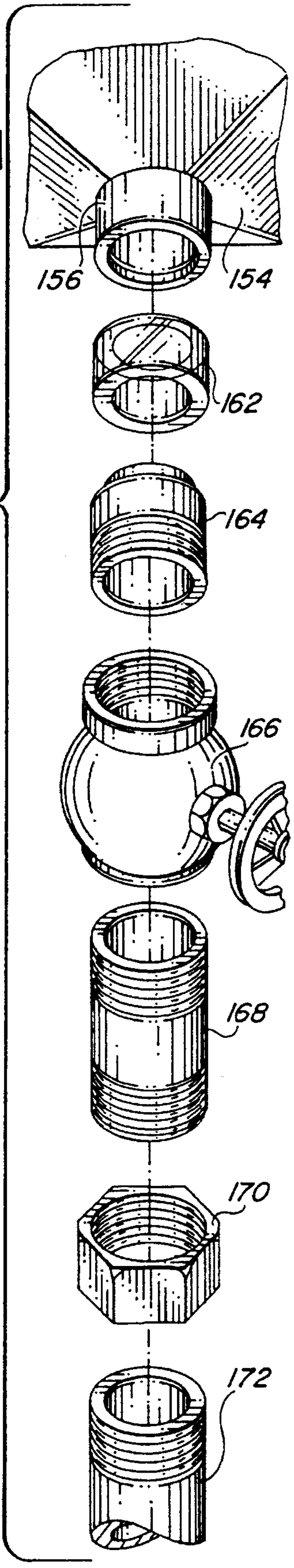

FIG. 10 is an exploded view of the apparatus identified by numeral 10 shown in FIG. 8.

DESCRIPTION OF THE PREFERRED EMBODIMENT

Referring to FIG. 1, there is shown a parts washer 10 for washing and cleaning parts within a basin 12 for receiving the solvent to be used and the parts to be washed. A spigot 14, which may include a flexible conduit 16 terminated by a nozzle 18 in fluid communication with a pipe 20, dispenses solvent in response to opening of valve 22. A cover 24 is attached by a hinge defining a pivot axis 26 to permit downward pivotal movement of the cover to close the top of basin 12 within cabinet 28. This cover serves to shield the basin against debris during non use. Moreover, in the event the solvent within the basin catches on fire, closing of the cover would suffocate and extinguish the fire.

Figure 2A:
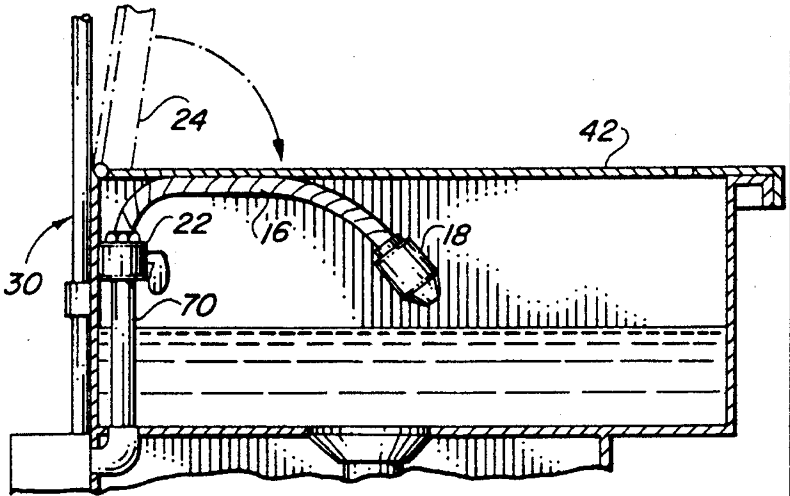
FIG. 2 is a cross-sectional view taken along lines 2—2, as shown in FIG. 1.

Referring jointly to FIGS. 1, 2, 2a, 3 and 4, further details attendant cover 24 and its closure will be set forth. A stanchion 30 may be attached to the rear of parts washer 10 by any conventional manner and it extends upwardly past cover 24 in the raised position to support a light 32. A fusible link 34, representatively illustrated in FIG. 3, is attached to and extends from stanchion 30. The fusible link includes a cross 36 at its terminal end. An opening 38 having a downwardly depending slot 40 is formed in panel 42 of cover 24. Upon placing cover 24 into its upright position, cross 36 of fusible link 34 is inserted through aperture 38 and shank 44 of the fusible link is inserted into slot 40. In this position, the cross arms will preclude withdrawal of the fusible link from opening 38. As noted in dashed lines in FIG. 2a, cover 24 leans forwardly in the normal upright position. In the event a fire should start within basin 12, the heat from the fire will cause cross 36 to melt. Upon such melting, the fusible link will no longer restrain forward and downward pivotal movement of cover 24. Accordingly, the cover will automatically pivot downwardly to close the open top of the basin and any fire therein will be extinguished. As depicted in FIG. 2a, flexible conduit 16 of spigot 14 will be forced to bend downwardly to accommodate closure of the cover.

Referring jointly to FIGS. 1, 2 and 7, details of the operation of parts washer 10 will be described. Basin 12 includes a drain 50, which drain may be plugged by a plug 52 to permit the washing fluid or solvent to stand within the basin during washing. The drain includes and is in fluid communication with a downwardly extending pipe 54 and the drain has an outlet 56 at top 58 of a tank 60. This tank is essentially filled with a solvent filtering fluid 62, such as water. A further tank 64 is located above tank 60 and contains the washing fluid or solvent 66 to be used during washing of the parts. The density of the washing fluid must be less than the density of the filtering fluid. Conduit means 68 and 70 place the interior of tank 60 in fluid communication with the interior of tank 64. A pump 72 includes an inlet 74 disposed within solvent 66 the pump pumps the solvent through a filter, such as externally mounted filter 76. The outlet of the filter is in fluid communication with pipe 20 to provide outflow of solvent through nozzle 18 of spigot 14 upon opening of valve 22.

In operation, a part to be washed is placed beneath nozzle 18 and subjected to a flow of solvent thereabout. The solvent and any contaminants or debris washed off the part enter drain 50 and are conveyed downwardly through pipe 54 into tank 60. Because solvent 66 is less dense than water 62, the solvent will percolate upwardly through the water, through conduit means 68 and 70 and into tank 64. During upward percolation of the solvent, any entrained contaminants or debris will become segregated from the solvent and sink to the bottom of tank 62. Such contaminants and debris will ultimately form a sludge 80 at the bottom of the tank.

Upon sufficient accumulation of sludge 80 within tank 60, it becomes necessary to remove the sludge for appropriate disposal in accordance with regulations. To simplify removal of tank 60, it may be mounted upon roller tracks 90, 92 formed as part of cabinet 28. Pipe 54 includes a union 94 interconnecting threaded end 96 of the pipe with threaded hollow stub 98 extending upwardly from top 100 of tank 60. By rotating union 94, it will become threadedly disengaged from stub 98. Presumably, such disengagement is effected after all of the solvent has drained from basin 12. Conduit means 68 must separate to permit detachment of tank 60 from tank 64 and means must be provided to prevent down flow of washing fluid or solvent 66. To accommodate these purposes, a valve, such as a gate valve 102, may be attached to the exterior surface of bottom 104 of tank 64 adjacent opening 106 in the bottom. The gate valve includes a depending threaded stub 108. An upwardly extending stub 110 is mounted on top 100 of tank 60 and in fluid communication with outlet 112. A union 114 threadedly interconnects stubs 108, 110. By rotating the union, the opposed studs may be disengaged from one another. Similarly, conduit means 70 includes a valve, such as gate valve 120, a depending threaded stud 122, an upwardly extending threaded stub 124 in fluid communication with outlet 126 in top 100 of tank 60 and a union 128. By rotating union 128, disengagement between stubs 122 and 124 may be effected. After closure of gate means, such as gate valves 102, 120, unions 114, 128 may be rotated to disconnect stubs 110, 128 of tank 60 and union 94 is rotated to disengage stub 98. Thereafter, tank 60 may be slidably removed from within cabinet 28. Disposal of sludge 80 and filtering fluid 62 (water) within the tank may be undertaken in accordance with appropriate regulations. A replacement tank may thereafter be installed within cabinet 28 by reconnecting pipe 54 with stub 98 and conduit means 68 and 70 may be reconnected by reversing the procedure described above.

As particularly illustrated in FIG. 6, the gate valves, such as gate valve 102, may include an extended handle or rod 136 extending exteriorly of cabinet 28 to facilitate opening and closure of the gate valve. Alternatively, valves of other types may be employed.

Under presently existing regulations attendant disposal of sludge, and particularly toxic sludge, a significant fee is imposed for disposal of sludge having free or standing water. A significantly reduced fee is imposed if the sludge is primarily only moist and without standing water. Because of this difference in disposal costs, significant impetus exists for eliminating free water from the sludge obtained during operation of a parts washer.

To serve these purposes and yet provide a removal tank for housing moist sludge, variant 140 of a parts washer illustrated in FIG. 8 was developed. As the variant relates primarily to the apparatus located beneath basin 12, the upper portion of the parts washer is not illustrated. A tank 142 is located beneath basin 12. Drain 144 drains the washing fluid and any contaminants or debris removed from the parts being washed from basin 12. A discharge pipe 146 conveys the washing fluid and contaminants to terminal end 148. A washing fluid or solvent 150 is present within tank 142. The filtering fluid or water 152 is also present in the tank to a level above terminal end 148 of the drain pipe. Since the washing fluid is less dense than the filtering fluid, the washing fluid will be supported upon the filtering fluid, as illustrated. The lower end of tank 142 includes a downwardly and centrally sloping bottom 154 to channel and direct contaminants and debris into downwardly depending outlet conduit 156. A pump 158 includes an inlet (not shown) in fluid communication with solvent 150 and the outlet of the pump is pumped through conduit 160 to filters and to the spigot, as described above with regard to FIGS. 1, 2 and 7.

In operation during washing of a part, the washing fluid and any contaminants and debris will flow downwardly through pipe 146 and be discharged through terminal end 148. The solvent, being less dense than the filtering fluid, will percolate upwardly until it rests upon the filtering fluid.

The formerly entrained contaminants and debris will be segregated and drift downwardly to bottom 154 and ultimately into discharge conduit 156.

Referring jointly to FIGS. 8 and 10, further details attendant channeling of the contaminants and debris forming the sludge will be described. A sight glass 162 is disposed at the lower end of conduit 156. A pipe 164 extends downwardly from the sight glass and supports valve means 166, such as a ball valve as illustrated. A further pipe 168 extends downwardly from the valve means. A union 170 interconnects pipe 168 with a further lower pipe 172 extending upwardly from valve means 174, which valve means may also be a ball valve. A threaded stub 176 extends upwardly from sludge tank 178 into threaded engagement with valve means 174. Tank 178 is a depository for sludge 180 that is collected from the washing of parts.

During washing of parts within basin 12, valve means 174 is closed and valve means 166 is open. The contaminants and debris washed from the parts will migrate downwardly through filtering fluid 162 and be channeled by bottom 154 into discharge conduit 156. These contaminants and debris will migrate downwardly further past sight glass 162, pipe 164, valve means 166, pipe 168, union 170 and pipe 172 and rest upon the closure within valve means 174. Depending upon the rate of contaminant and debris removal from the parts being washed, the debris will accumulate downstream of discharge outlet 156 more or less rapidly. During such accumulation, the filtering fluid or water, although permeating the accumulating sludge, will tend to rest thereupon. When the sludge has accumulated to the extent it becomes visible through sight glass 162, it is time to drain the sludge into tank 178. To effect such drainage, valve means 166 is closed to prevent down flow of filtering fluid. Thereafter, valve means 174 is opened and the sludge accumulated downstream of valve means 166 will drop into tank 178. While sludge 180 may be moist, there will be no standing water due to the compressive effect of accumulation of the sludge in the column downstream of discharge outlet 156. After discharge of the sludge into tank 178, valve means 174 is closed and valve means 166 is open. Further accumulation downstream of discharge outlet 156 and upstream of valve means 174 will now occur.

After sufficient accumulation of sludge 180 within tank 178, the tank may be removed. To effect removal, union 170 is rotated to disengage pipes 168 and 172 after valve means 166 has been closed. The tank may now be taken to a removal site for disposal in accordance with regulations attendant the type and nature of the sludge collected. A replacement tank 178 is installed by reconnecting pipe 172 with pipe 168 through union 170. It is to be understood that disengagement of tank 178 may be accomplished by mechanisms downstream of valve means 174 or at any other location.

Depending upon the nature and constituency of the contaminants and debris discharged into washing fluid 152 and migrating onto sloping bottom 154, the slope may be more or less effective in channeling this matter into discharge conduit 156. To increase the slope of the bottom without compromising or significantly increasing the height of the parts washer, variant parts washer 190 shown in FIG. 9 may be employed.

Tank 142 includes a pair of discharge outlets 192 and 194. The bottom of tank 142 may be formed by a pair of funnels 196, 198 having their respective lower ends terminated by discharge outlets 192, 194. The increased steepness of the sides of funnels 196, 198 compared to bottom 154 of parts washer variant 140, will tend to urge migration of the contaminants and debris toward the respective discharge outlets. To accommodate filtering of the washing fluid, the terminal end of pipe 146 is split by a Y connector 200 into discharge pipes 202 and 204. Discharge pipe 202 includes an outlet located beneath the surface of washing fluid (water) 206 within funnel 196. Similarly, discharge pipe 204 includes an outlet beneath the surface of washing fluid (water) 206 within funnel 198. It may be appreciated that the surface or upper level of the washing fluid may be located at or even above Y connector 200.

Each of discharge outlets 192, 194, includes a sight glass, a pair of valve means and disengageable conduits in fluid communication with a tank 208 for collecting sludge 210, as described above with regard to parts washer variant 140. Removal of filled tank 208 may be accomplished in the same manner as removal of tank 178.

The collection of moist, but not wet, sludge 210 within tank 208 is equivalent to or duplicative of the procedure described above with respect to parts washer variant 140. After withdrawal of a tank for disposal of the collected sludge, it is anticipated that caps or other closures may be employed to close the inlet(s) to the tank to avoid spillage during transport.

Under certain circumstances, it may be expedient to employ flow directing mechanisms or mechanical wipers for continuously or periodically urge contaminants and debris into the respective discharge outlets of variants 140 and 190. Such further mechanisms, pumps or other apparatus will necessarily increase to costs and complexity of the parts washer. Access to the various mechanisms for mechanically disengaging the sludge containing tank may be through hatches in the respective cabinets or through openings or spaces provided for such purposes. Similarly, the tanks may be on roller tracks as described with regard to cabinet 28 (see FIG. 1). Alternatively, other mechanisms or no mechanisms for aiding removal and replacement of the tanks may be employed.

Depending upon the parts being washed and/or the nature of the facility performing the parts washing function, a water based or aqueous solvent may be used. Under such circumstances, only the single solvent fluid will be present in the parts washer. The heavy particulates and/or insoluble contaminants or debris entrained within the solvent will settle or migrate downwardly. The soluble contaminants or debris will remain in the solvent. Such remaining contaminants or debris may have a diluting effect upon the solvent, which is resolved by periodically replacing the solvent. The particulates or insoluble contaminants and debris will settle within tank 60 of parts washer 10, as represented by sludge 80 illustrated in FIGS. 2 and 7. As discussed above, tank 60 may be removed and replaced periodically for purposes of disposing of the sludge and the residual solvent contained therein.

If a water based or aqueous solvent is used in either of variant parts washers 140, 190, there will, of course, only be one fluid disposed therein. The heavy particulates and insoluble contaminants and debris will settle and ultimately migrate toward and through the respective discharge outlets (156, 192 and 194). As discussed in detail above, the heavy particulates and insoluble contaminants and debris will be channeled toward the respective tank (178 or 208) to form the sludge (180, 210) at the bottom of the respective tank. Through the procedures discussed above of limiting fluid flow into the tanks, the sludge will be moist but essentially devoid of any free or standing solvent. Disposal of the tanks and the sludge contained therein can be effected by implementing procedures comporting with attendant regulations.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A parts washer having a washing fluid for washing parts and a filtering fluid of greater density than the washing fluid for filtering contaminants and debris from the washing fluid as the washing fluid percolates upwardly through the filtering fluid, said parts washer comprising in combination:

a) a basin for washing the parts with the washing fluid;

b) a drain extending downwardly from said basin for conveying the washing fluid and any entrained contaminants and debris washed from the parts, said drain including an outlet;

c) a first tank disposed below said basin and in fluid communication with said outlet to receive the washing fluid and any entrained contaminants and debris and for housing the filtering fluid to filter the washing fluid with the filtering fluid and to guide any contaminants and debris filtered and segregated from the washing fluid into a conduit;

d) a second tank disposed below said first tank and in fluid communication with said first tank through the conduit for receiving and containing the segregated contaminants and debris and some of the filtering fluid;

e) a pump for pumping the washing fluid from said first tank to said basin;

f) a disconnect for disconnecting said conduit between said first tank and said second tank; and g) a detachment device for removing said second tank containing the contaminants and the debris and any filtering fluid for subsequent disposal of the contaminants, debris and filtering fluid.

2. The parts washer as set forth in claim 1 wherein said disconnect includes a valve for preventing fluid flow from said first tank through said conduit.

3. The parts washer as set forth in claim 1 wherein the washing fluid and the filtering fluid are disposed in said first tank with the washing fluid being supported upon the filtering fluid in response to their respective densities.

4. The parts washer as set forth in claim 3 including a channel for urging transport of any quantity of contaminants and debris accumulated in said first tank into said conduit.

5. The parts washer as set forth in claim 1 including a cover for said basin and means for closing said cover in response to the heat generated by an accidental fire in and about said basin.

6. The parts washer as set forth in claim 5 wherein said closing means includes a fusible link.

7. A parts washer for removing and disposing of sludge resulting from the washing of parts in said parts washer, said parts washer comprising in combination:

a) a basin for washing the parts with a solvent to entrain the contaminants washed from the parts in the solvent;

b) a first tank for housing the solvent and a filtering fluid;

c) a pipe for conveying the solvent and any entrained contaminants from the basin into the filtering fluid to percolate the solvent through the filtering fluid upwardly, which filtering fluid is of greater density than the solvent, to segregate the solvent from any entrained contaminants;

d) a second tank disposed beneath said first tank for collecting and settling the segregated contaminants as a sludge;

e) a guide for directing the downward migrating segregated contaminants only into said second tank; and f) apparatus for removing said second tank from said parts washer to dispose of the sludge.

8. The parts washer as set forth in claim 7 wherein said guide includes a conduit for conveying the segregated contaminants into said second tank.

9. The parts washer as set forth in claim 8 including a valve for terminating flow through said conduit and a disconnect device for severing said conduit to segregate said second tank.

10. The parts washer as set forth in claim 8 wherein said first tank includes said guide for channeling the contaminants to said conduit.

11. A parts washer for removing and disposing of sludge resulting from the washing of parts in said parts washer, said parts washer comprising in combination:

a) a basin for washing the parts with a solvent to entrain the contaminants washed from the parts in the solvent;

b) a first tank for housing the solvent and a filtering fluid;

c) a pipe for conveying the solvent and any entrained contaminants from the basin into the filtering fluid to percolate the solvent through the filtering fluid upwardly, which filtering fluid is of greater density than the solvent, to segregate the solvent from any entrained contaminants;

d) a second tank for collecting and settling the segregated contaminants as a sludge;

e) a conduit for conveying the segregated contaminants;

f) a valve for selectively precluding discharge of the contaminants from said first tank into said conduit;

g) a further valve downstream of said valve for selectively precluding discharge of the contaminants from said conduit into said second tank and a disconnect for disconnecting said conduit between said valve and said further valve; and h) apparatus for removing said second tank from said parts washer to dispose of the sludge.

12. The parts washer as set forth in claim 11 including an indicator for indicating the degree of fill of said conduit with contaminants.

13. The parts washer as set forth in claim 12 wherein said indicator is upstream of said further valve.

14. A parts washer for removing and disposing of sludge resulting from the washing of parts in said parts washer, said parts washer comprising in combination:

a) a basin for washing the parts with a solvent to entrain the contaminants washed from the parts in the solvent;

b) a first tank for housing the solvent and a filtering fluid;

c) a pipe for conveying the solvent and any entrained contaminants from the basin into the filtering fluid to percolate the solvent through the filtering fluid upwardly, which filtering fluid is of greater density than the solvent, to segregate the solvent from any entrained contaminants, said pipe including a pair of outlets for percolating a portion of the solvent and entrained contaminants through different sections of the filtering fluid to segregate the solvent from the entrained contaminants;

d) a second tank for collecting and settling the segregated contaminants as a sludge; and e) apparatus for removing said second tank from said parts washer to dispose of the sludge.

15. The parts washer as set forth in claim 14 including first and second conduits interconnecting said first and second tanks.

16. The parts washer as set forth in claim 15 including a first channeling element for channeling the contaminants discharged from one of said outlets into said first conduit and a second channeling element for channeling the contaminants discharged from the other of said outlets into said second conduit.

17. A method for removing and disposing of sludge resulting from the washing of parts in a parts washer, said method comprising the steps of:

a) washing the parts with a solvent to entrain in the solvent the contaminants washed from the parts;

b) percolating the solvent and entrained contaminants in a tank through a filtering fluid of greater density than the solvent to segregate the entrained contaminants from the solvent;

c) collecting and settling the segregated contaminants in a further tank as a sludge, said steps of collecting and settling including the steps of: accumulating the contaminants in a conduit disposed between the tank and the further tank, selectively precluding with a valve discharge of the contaminants into the further tank, and selectively inhibiting with a further valve upstream of said valve accumulation of contaminants between the further valve and the further tank during discharge of the contaminants through the valve into the further tank; and d) removing the further tank and collected sludge from the parts washer to dispose of the sludge.

18. The method as set forth in claim 17 including the step of indicating the degree of fill of the conduit with contaminants.

19. A method for removing and disposing of sludge resulting from the washing of parts in a parts washer, said method comprising the steps of:

a) washing the parts with a solvent to entrain the contaminants washed from the parts in the solvent;

b) segregating the solvent from any heavy particulates and insolubles of the entrained contaminants by percolating the solvent through a filtering fluid more dense than the solvent and disposed in a tank to permit downward migration of the heavy particulates and insolubles;

c) collecting all of the segregated downwardly migrating heavy particulates and insolubles in the tank as a sludge; and d) removing the tank and collected sludge laterally from the parts washer to dispose of the sludge.

20. The method as set forth in claim 19 including the steps of housing the filtering fluid in the tank, percolating the solvent through the filtering fluid in the tank, further housing the solvent primarily in a further tank and conveying through a conduit the solvent from the tank to the further tank.

21. The method as set forth in claim 20 including the step of terminating flow through the conduit and the step of severing the conduit to carry out said step of removing.

22. The method as set forth in claim 20 including the steps of terminating flow between the tank and the further tank and segregating the tank from the further tank prior to exercise of said step of removing.

23. The method as set forth in claim 22 including the step of indicating the degree of fill of the conduit with contaminants.

* * * * *